Patented Aug. 15, 1939

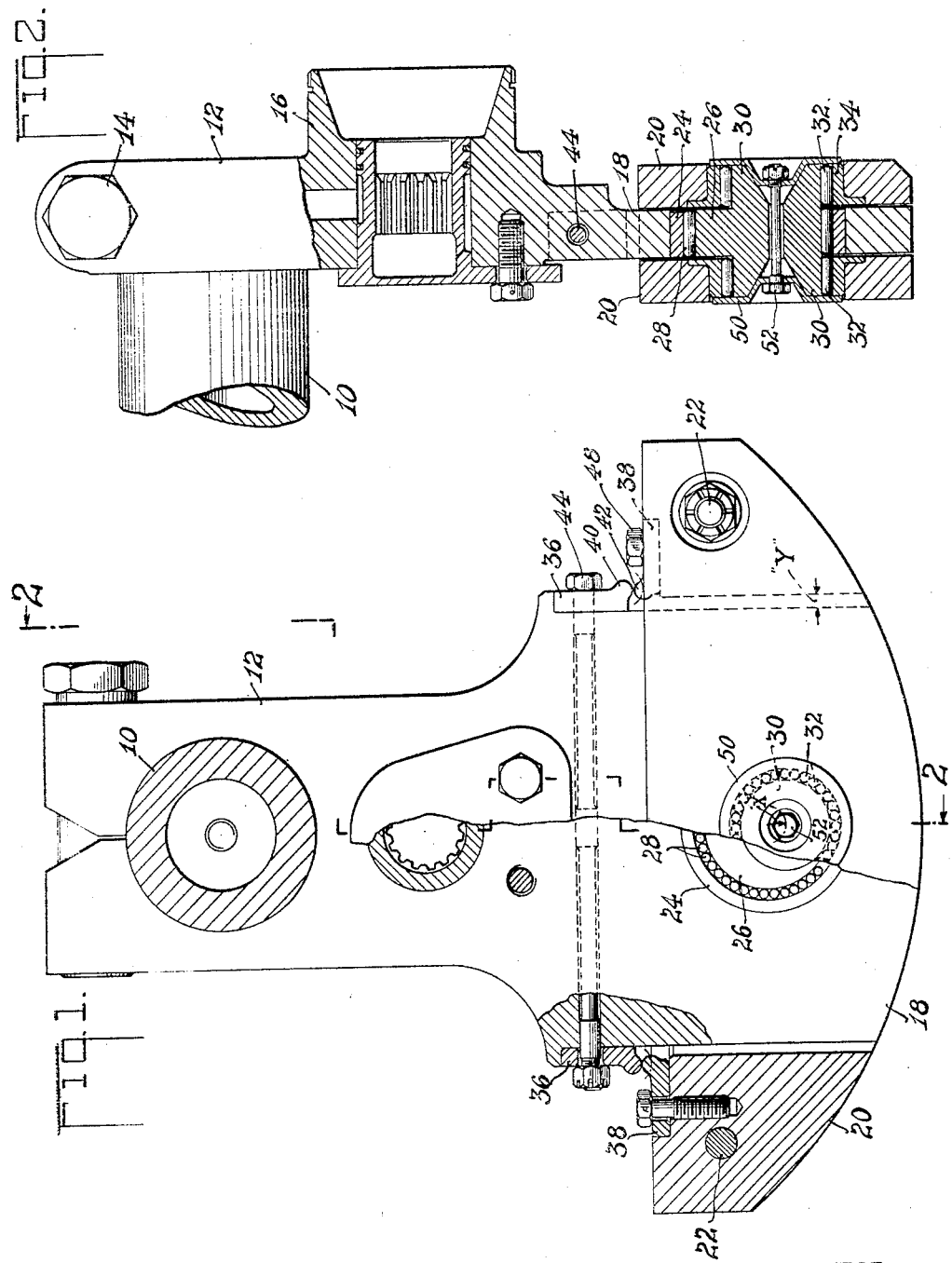

2,169,222

UNITED STATES PATENT OFFICE 2,169,222

DYNAMIC DAMPER HAVING SINGLE SUPPORT AND CAM STABILIZERS

Roland Chilton, Ridgewood, N. J., assignor, by mesne assignments, to Wright-Aeronautical Corporation, Paterson, N. J., a corporation of New York Application November 3, 1937, Serial No. 172,557

12 Claims. (Cl. 74—604)

This invention relates to means for damping torsional vibrations, as in engine crankshafts, and in certain aspects comprises improvements on patents No. 2,112,984 issued April 5, 1938, No. 2,116,861, issued May 10, 1938 and No. 2,121,950 issued June 28, 1938, in my name. The specific embodiment illustrated in the drawing comprises a design suited for a large radial aircraft engine.

The invention utilizes the known principle that, if a mass be mounted as a pendulum on a rotating shaft (so as to be stabilized by centrifugal forces) the pendulum frequency goes up with the rotational speed, whereby the pendulum makes the same number of swings per revolution at all speeds of revolution and it is further known that, if this natural frequency be made to synchronize with the frequency of the impulses to which the shaft is subject in operation, then the pendulum will swing 180° out of phase with the exciting impulses which are, accordingly, neutralized whereby torque irregularities are smoothed out and torsional vibration suppressed.

One of the great advantages of this system for radial engines is that these engines already include massive counterweights for counterbalancing the crankpin, connecting rod and piston system and by suitable pendulum suspension, the existing counterweight mass may be used as the damper mass, so that large dampening masses are available without increasing the overall weight.

In the case of a 4 stroke cycle nine-cylinder radial engine, the principal disturbing force has a frequency of 4½ per revolution which is, accordingly, the desired pendulum frequency of the mass which requires a very small pendulum length, of the order of ⅜" in the type of engine where this system has been most widely used.

In my Patent 2,112,984 a pair of rollers are loosely engaged to roll in holes or tracks, formed in the crankshaft and counterweight, the radius of pendulum swing being determined by the difference in diameter between the rollers and the tracks. Such so-called "bi-filar" suspension endows the weight with the properties of a "simple" pendulum, that is to say, every element of the weight follows an arcuate path of the same radius, there being no polar or rotational component.

The counterweights in radial engines have a radius of gyration of three or four inches and it is known that the fastest period that can be obtained by a simple single point suspension is that when the supporting point is located at the radius of gyration, wherefore it is quite impossible to obtain the necessary frequency in a conventional size of counterweight by permitting this to *rotate* about a single point of suspension.

It will be also understood that these large counterweights are subject to very great centrifugal forces (of the order of 10 tons in the case illustrated). These high forces have to be resisted by the pendulum supporting means which must, at the same time, be frictionless since any substantial damping destroys the effectiveness of the device.

The spaced twin roller support of my copending application has been successfully used in some thousands of aircraft engines. In remote cases certain types of engine may develop torsional vibrations in the crankarm extension which supports the counterweight, these vibrations being in planes other than the plane of rotation, and since some actual clearance is necessary between the counterweight and the extension which it embraces, there have been instances where this vibration has induced axial sliding between the roller and the tracks which has produced "scuffing" or wearing of the rolling surfaces. Accordingly, one object of the present invention is to provide a novel suspension means whereby a single supporting means is used with auxiliary means to constrain all points of the weight from departure from the arcuate path prescribed by the single pendulum supporting means. This single support permits slight torsional freedom between the weight and the shaft extension without axial movement.

Other objects and advantages will be obvious from this preamble and the following description with reference to the drawing in which, Fig. 1 is an end view in fragmentary section of a crankshaft embodying the invention, and Fig. 2 is a longitudinal section on the line 2—2 of Fig. 1.

In this drawing 10 designates a conventional crankpin to which is secured a rear cheek 12 by usual clamp bolt 14. The rear cheek 12 carries the usual rear journal 16 and is provided with an extension member 18 which is embraced by the counterweight or pendulum mass 20, which is conveniently formed in two halves secured together by bolts 22. In the extension 18 there is formed a relatively large bore in which is fitted a hardener race or bushing 24 which supports an eccentric 26 through rollers or needles 28, integral eccentric pins 30 being provided with rollers 32 engaging bushings 34 fitted into the halves of the counterweight 20, as shown. This antifriction eccentric 26—30 defines a small radius of travel indicated by the dotted path X, the radius of curvature of the path being, of course, defined by the eccentricity of the pins 30 and being proportioned to give the desired pendulum frequency.

The bushings 34 in the counterweight 28 are preferably disposed on a radial line through the center of gravity thereof so that there are no forces tending to displace the counterweight rotationally relative to the shaft. However, in operation, due to incidental vibrations, the structure so far described, would permit the counterweight to drift off from the rectangular relation shown within the limits defined by the clearances indicated at Y which limits the travel of the counterweight but which is pre-set to be considerably greater than the normal amplitude of pendulum vibration in operation. However, should the counterweight become displaced rotationally about the eccentric pin 30, this clearance Y would be reduced causing the weight to bump which is likely to produce damaging bouncing effects. This is prevented, according to one of the major provisions of the present invention, by auxiliary cam blocks 36—38 secured respectively to the crankshaft and counterweight by bolts 44—46, as shown. These blocks have cam faces or toes 40—42, the aggregate radii of curvature of which are equal to the radius of the path of travel X defined by the eccentric wherefore the ends of the weight are constrained against departure from such path whereby all elements of the weight follow identical arcuate paths. The eccentric 26, 30 is provided with end washers 50, held in place by a bolt 52, for retaining the bearing rollers 32 in proper axial relationship.

It should be emphasized that the entire support against the very large centrifugal forces is through the main single floating eccentric support 26—30 and that the cam sliding means 36—38 are entirely free of operating forces being merely included to prevent the weight from drifting off from the rectangular relationship shown. In other words, the motion of the weight is such that in all positions, any line on the weight remains in constant angular relation to the shaft throughout the pendulum swing. The cams 36—38 are merely conformed to this mode of travel and in actual operation, the forces at the cam contacts (if any) will be merely incidental to preventing the weight from drifting off position and taking up the clearances Y. The particular mode of counterweight support against centrifugal force as herein shown and described is not to be considered as limiting the scope of the invention, since any form of single support against centrifugal force which permits translational pendular movement of the counterweight along with angulation thereof about the support is feasible in carrying out the teachings of the invention.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination, a shaft extension member and a counterweight member one embracing the other for limited relative motion, said members having relatively eccentric openings, a single pin engaging within said openings supporting the counterweight upon the extension against the action of centrifugal force, said openings and pin defining an arcuate path of travel for the weight, and a plurality of auxiliary co-acting guiding means on the respective members spaced from said openings and pin and defining an arcuate path of travel for the counterweight identical with the first path, said auxiliary means being organized to be free from the action of centrifugal force.

2. In combination, a shaft member and a counterweight member organized for limited relative travel, connecting and supporting means therebetween comprising a single pin having relatively eccentric journals in bearing engagement with respective members substantially at the center of the counterweight for supporting said counterweight member as a free swinging pendulum on said shaft member, and auxiliary co-acting cam means on the respective members for locating the weight against rotation relative to said extension.

3. In combination, a shaft member, a counterweight member, said members having relatively eccentric openings, a single pin engaging within said openings suspending the entire weight against centrifugal force and defining a predetermined path of arcuate swing therefor at said suspension, and auxiliary weight guiding means comprising co-acting elements on the shaft member and counterweight member constraining the weight as a whole against displacement from said path.

4. In combination, a shaft member, a counterweight member, said members having relatively eccentric openings, a single pin engaging within said openings comprising weight suspension means, defining with said openings an arcuate path of travel and supporting said weight against outward displacement from said path under centrifugal force, and auxiliary weight guiding means comprising contacting elements on the shaft member and counterweight member spaced from said suspending means and rigid against departure of said weight inwardly of said path.

5. In combination, a shaft member, a counterweight member, a single suspension means and plural guiding means comprising elements on one member engaging spaced points on the other member, each means defining equal arcuate paths of counterweight travel, said suspension means being rigid against centrifugal forces and said guiding means being rigid against centripetal forces only.

6. In combination, a shaft member and a counterweight member organized for slight relative displacement, a single means having relatively eccentric journals in bearing engagement with the respective members adapted to suspend said weight against centrifugal forces and to define an arcuate path of weight travel at the point of suspension, and auxiliary guiding means carried by one member and contacting the other constraining said counterweight against angular swing with respect to said shaft member.

7. In combination, a crankshaft extension member and a counterweight member one embracing the other for limited relative movement, said members each having an opening, the openings being in eccentric relation, single pin means engaging within said openings supporting the counterweight on the extension member against the action of centrifugal force, said openings, with said pin defining an arcuate path of counterweight swing, and two sets of cams laterally spaced from said pin, each set comprising contacting cams respectively fixed to the extension and the counterweight, the cams being profiled to define the same arcuate path of swing.

8. In combination, a crankshaft extension member and a counterweight member one embracing the other for limited relative movement, said members each having an opening, the openings being in eccentric relation, single pin means engaging within said openings supporting the counterweight on the extension member against the action of centrifugal force, said openings, with said pin defining an arcuate path of counterweight swing, and two sets of cams laterally spaced from said pin, each set comprising contacting cams respectively fixed to the extension and the counterweight, the cams being profiled to define the same arcuate path of swing, the counterweight cams facing inwardly toward the shaft center, and the extension cams facing outwardly from the shaft center.

9. In combination, a crankshaft extension member and a counterweight member one embracing the other for limited relative motion, said members having relatively eccentric openings and the opening in said counterweight member substantially passing through the center of gravity thereof, a single pin engaging within said openings supporting the counterweight upon the extension against the action of centrifugal forces and said openings and pin defining an arcuate path of travel for the counterweight, and a plurality of auxiliary coacting guiding means on respective members, spaced from said openings and pin and defining an arcuate path of travel for the counterweight identical with the first path, said auxiliary means being organized to be free from the action of centrifugal force and serving to stabilize the counterweight during its movement in the arcuate path to translational as distinct from rotational movement.

10. In combination, a shaft having an extension member, a counterweight member, single means pendulously supporting the counterweight on the extension for free arcuate translation, and for angulation, relative thereto, said means serving as the sole support for said counterweight against the action of centrifugal force, and guiding means inhibiting said angulation comprising spaced elements on one member engaging correspondingly spaced points on the other member, each guiding means defining arcuate paths of counterweight translation identical with that defined by said single supporting means.

11. In combination, a shaft having an extension, a counterweight articulated thereon, said articulation comprising means to support the counterweight against the action of centrifugal force and allowing angulation of, and defining an arcuate path of translation for, the counterweight relative to the extension, and guiding means rigid against centripetal force, spaced from said articulation, for suppressing counterweight angulation.

12. In combination, a shaft having an extension, a counterweight articulated thereon, said articulation comprising means to support the counterweight against the action of centrifugal force and allowing angulation of, and defining an arcuate path of translation for, the counterweight relative to the extension, and guiding means spaced from said articulation comprising contactable elements on the extension and counterweight defining an arcuate path of translation substantially identical with that defined by the articulation.

ROLAND CHILTON.